United States Patent [19]

Appelmann

[11] Patent Number: 4,964,112
[45] Date of Patent: Oct. 16, 1990

[54] METHOD FOR MONITORING THE QUALITY OF A DIGITAL SIGNAL IN SECTIONS OF A DATA TRANSMISSION CIRCUIT

[75] Inventor: Wolfgang Appelmann, Munich, Fed. Rep. of Germany

[73] Assignee: Siemens Aktiengesellschaft, Berlin and Munich, Fed. Rep. of Germany

[21] Appl. No.: 349,431

[22] Filed: May 9, 1989

[30] Foreign Application Priority Data

Jun. 1, 1988 [DE] Fed. Rep. of Germany ....... 3818716

[51] Int. Cl.$^5$ .............................................. H04J 3/14
[52] U.S. Cl. ...................................... 370/13; 370/17; 370/99; 370/105.1; 370/110.1
[58] Field of Search ...................... 370/13, 17, 99, 105, 370/110.1, 105.1

[56] References Cited

U.S. PATENT DOCUMENTS

| | | | |
|---|---|---|---|
| 4,594,708 | 6/1986 | Servel et al. | 370/99 |
| 4,712,209 | 12/1987 | Kuritani et al. | 370/110.1 |
| 4,821,256 | 4/1989 | Schmidt et al. | 370/13 |

FOREIGN PATENT DOCUMENTS

| | | | |
|---|---|---|---|
| 2556079 | 3/1977 | Fed. Rep. of Germany . | |
| 3619371 | 12/1987 | Fed. Rep. of Germany | 370/105 |
| 3620835 | 12/1987 | Fed. Rep. of Germany | 370/105 |
| 1401261 | 7/1975 | United Kingdom . | |

OTHER PUBLICATIONS

Article Telecom Report 10, 1987, No. 5, pp. 260–264. Equivalent article in German.
Article of International Telegraph and Telephone Consultative Committee CCITT of Nov. 1987 COM XVIII--113-E, entitled "Report of the Meeting of Experts on Broadband Interface Aspects of Study Group XVIII", (Geneva, Nov. 9-11, 1987).
CCITT Publication of Aug. 1986, entitled "Part C of the Report of the Geneva Meeting" (Jul. 1-8 1986.

Primary Examiner—Douglas W. Olms
Assistant Examiner—Alpus H. Hsu
Attorney, Agent, or Firm—Hill, Van Santen, Steadman & Simpson

[57] ABSTRACT

A method for monitoring the quality of a digital signal in sections of a data transmission circuit wherein the quality of the transmitted digital signals is monitored in a synchronous network by digital signal distributors arranged along the circuit and the acquired data is forwarded to a centrally controlled emergency network switching system. A BIP-8 code word (bit-interleaved parity-8 code) in a B3 time slot for parity monitoring is transmitted from the source to a sink in the path overhead of a virtual container (VC-41) in a STM-1 signal. The code word is also transmitted as B4 monitoring in a Z time slot (Z4) of the path overhead which is available, and it is evaluated in every digital signal distributor and is re-supplied into the outgoing line of the signal distributors. Since every modification in the virtual container (VC-4) falsifies the B3 monitoring, a correction code word which cancels the modification by the BIP-8 code word in the first Z time slot (Z4) is inserted in a further Z time slot (Z5).

2 Claims, 2 Drawing Sheets

FIG 3

| | VC-4 | | | | | | | | |
|---|---|---|---|---|---|---|---|---|---|
| | 1 | 2 | 3 | 4 | 5 | 6 | 7 | 8 bit/byte | |
| J1 | | | | | | | | | 1 |
| B3 | | | | | | | | | 262 |
| Z4=B4 | | | | | | | | | 1828 |
| Z5 | | | | | | | | | 2089 |
| | | | | | | | | | 2349 |

METHOD FOR MONITORING THE QUALITY OF A DIGITAL SIGNAL IN SECTIONS OF A DATA TRANSMISSION CIRCUIT

BACKGROUND OF THE INVENTION

1. Field of the Invention

Quality monitoring of a data transmission circuit requires, first, the identification and record of errors in the digital signal or the failure of the signal, and, second, the identification of long-term changes in the transmission properties of the transmission circuits. The invention accomplishes this.

2. Description of the Prior Art

The structure of a centrally controlled emergency switching system is known from the periodical "Telcom Report" of 10 (1987) No. 2, pages 102 through 108, FIG. 8. Transmission circuits have switching stations that are also referred to as digital signal distributors or as cross-connect equipment, these are connected to regional centers which are located in communication with a network management center. When, for example, a regional center reports an interruption of the transmission circuit, then the network management circuit initiates the switching of a standby route.

A synchronous digital signal hierarchy is known from the publication CCITT Draft Recommendations G.70X, G.70Y and G.70Z. Digital signals of the lowest hierarchy level comprise a bit rate of 155.52 Mbit/s and a pulse frame which is referred to as a synchronous transport module STM-1. This is composed of a section overhead, an administration unit and an administration unit pointer. A virtual container which starts to indicate the administration unit pointer can be inserted into the administration unit. The virtual container is in turn composed of a path overhead and of a container in which a 139.264 Mbit/s signal exists. See also British patent No. 1,401,261, German No. 2,556,079, and the publication "International Telegraph and Telephone Consultative Committee Period 1985–1988 COM XVIII-113-E November 1987, Title Report of The Meetings of Experts on Broadband Interface Aspects of Study Group XVIII (Geneva, 9–11 November 1987) pages 1–87.

SUMMARY OF THE INVENTION

The virtual container contains 2349 bytes of 8 bits each. A BIP-8 code word which is a bit-interleaved parity-8-code is located in the path overhead in the standardized B3 bit for parity monitoring, and such BIP-8 code word determines whether the sum of the logical statuses of the respectively one bit place of all 2349 bytes is even or odd. With disturbance-free operation, this BIP-8 code word is transmitted unmodified from the digital signal source to the digital signal sink.

Further monitoring is provided in the synchronous transport module STM-1:

a standardized B1 byte is newly formed in every regenerator. This monitoring therefore extends only from regenerator to regenerator. A standardized B2-byte is newly formed at least at those locations where the pointer content is newly set, this ensuing in higher multiplex equipment and also potentially ensuing in line terminal equipment.

The object of the invention is to provide a monitoring method which acquires sections of data between digital signal distributors and between the digital signal source or, respectively, the digital signal sink and the neighboring digital signal distributor.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure, and in which:

BRIEF DESCRIPTION OF THE DRAWINGS

FIG. 3 shows the bytes in the virtual container VC-4.

DESCRIPTION OF THE PREFERRED EMBODIMENTS

Figure 1:
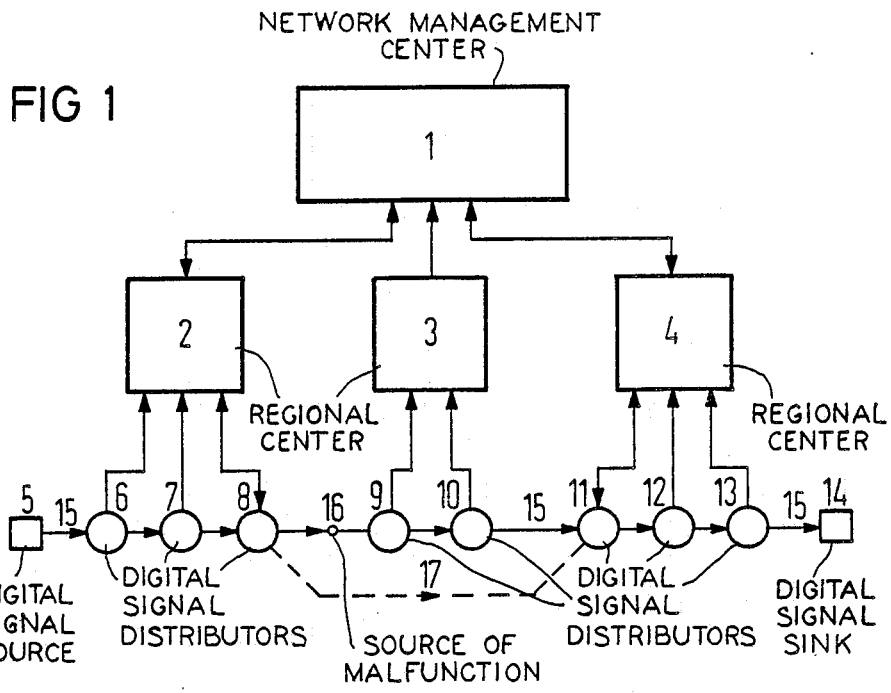
FIG. 1 illustrates the structure of a centrally controlled emergency network switching system.

FIG. 1 shows a centrally controlled emergency network switching system comprising a network management center 1, comprising regional centers 2 through 4, which includes a digital signal source 5, and digital signal distributors 6 through 13, connected as shown. Also a digital signal sink 14, and a transmission circuit 15. A source of malfunction 16 is also shown and a standby route 17. A digital signal is transmitted from the digital signal source 5 to the digital signal sink 14 via the transmission circuit 15. The digital signal is without deficiencies between the digital signal source 5 and the source of malfunction 16. The digital signal distributors 6 through 8 do not report any malfunction to the region center 2. The digital signal distributors 9 through 13 which are lying after the source of malfunction 16 recognize the malfunction and report this to the regional centers 3 and 4. As a result of these reports, the network management center 1 initiates the switching in of the standby route 17.

Figure 2:
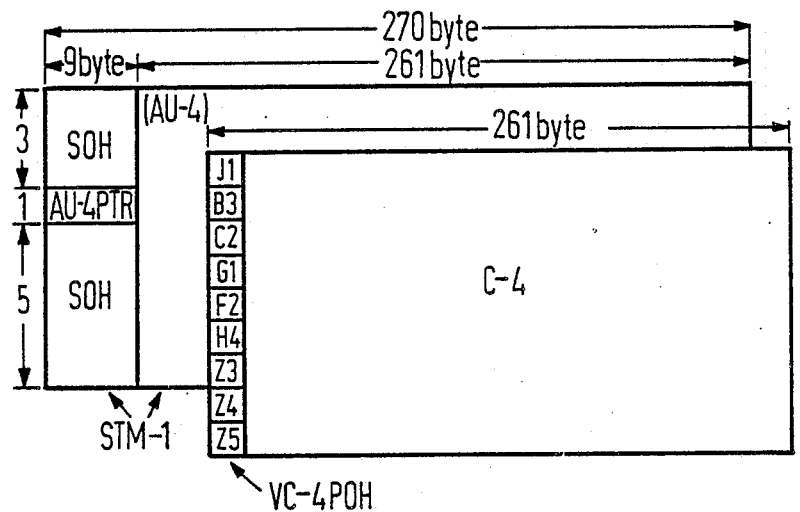
FIG. 2 shows a synchronous transport module STM-1 having a virtual container VC-4.

FIG. 2 shows a synchronous transport module STM-1 which comprises a section overhead SOH, the administration unit AU-4, the administration unit pointer AU-4 PTR, the virtual container VC-4, the path overhead VC-4 POH and the container C-4. The path overhead VC-4 POH contains bytes J1, B3, C2, E1, F2 and H4 that are already provided for a specific use according to the CCITT. However, the bytes Z3, Z4 and Z5 are readily available.

Figure 3:
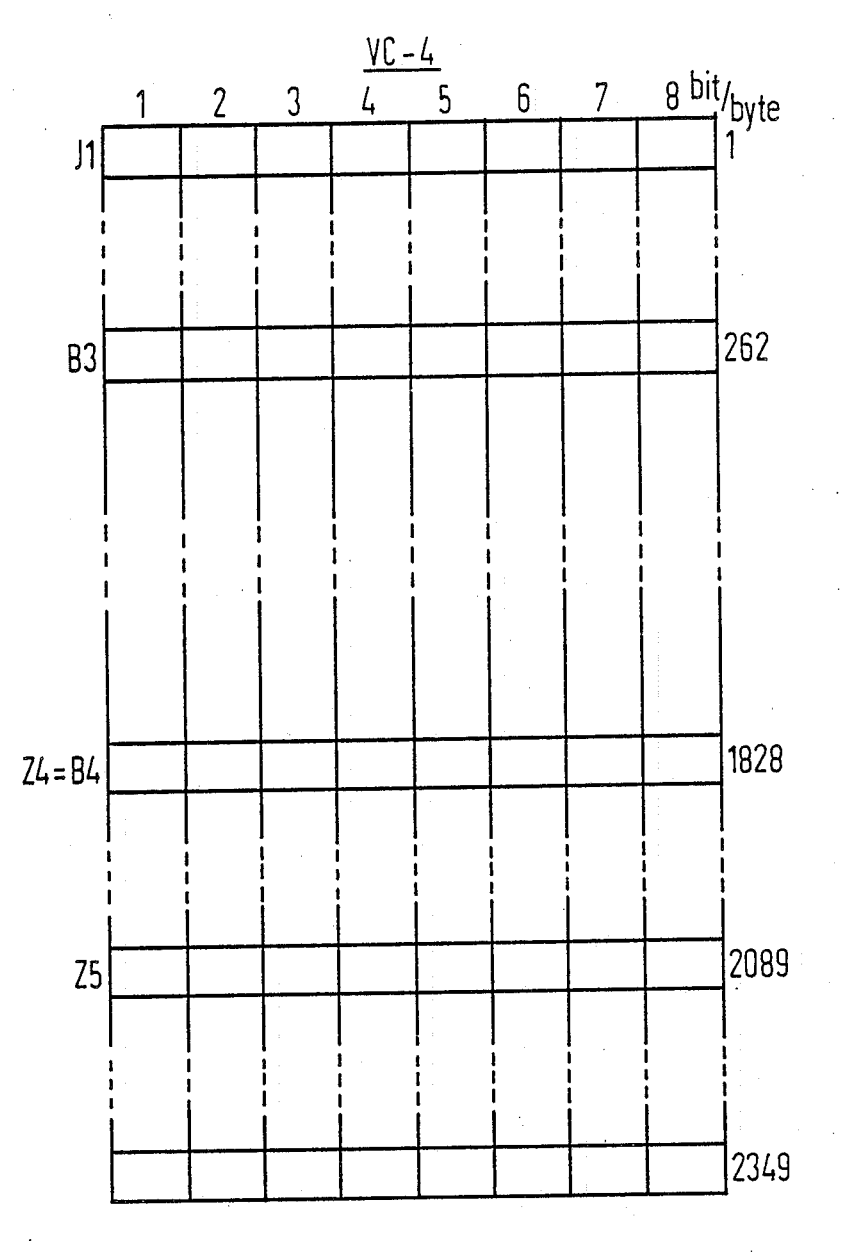

All 2349 bytes of the virtual container VC-4 are shown under one another in FIG. 3. The uppermost byte is a standardized J1 byte that is of no interest and bytes B3, Z4 and Z5 are emphasized. A BIP-8 code word is located in the B3 byte as B-3 monitoring. In each of its 8 bytes, this indicates whether the bit number of the respective bit place in the bytes 1 through 261 and 263 through 2349 is even or odd. This B3 byte must not be falsified by insertions into the Z4 and Z5 time slots.

This will not happen when the auxiliary BIP-8 code word and an identical correction code word are inserted into the Z4 time slot and into the Z5 time slot. This assumes that identical code words were already supplied into the Z4 and Z5 time slots at the source. When this is not the case, then these code words entered into the formation of the B3 byte. When an auxiliary BIP-8 code word is now inserted into the Z4 time slot, a correction code word must be inserted into the Z5 time slot in every digital signal distributor 6 through 13, and the bit sequence of this correction code word is selected such that after evaluation of the incoming auxiliary BIP-8 signal and the incoming correction signal so that the B3 monitoring does not detect any modification.

Every digital signal distributor 6 through 13 in FIG. 1 forms a new auxiliary BIP-8 code word and compares it to the one received and reports a potential error or the present condition to its regional center 2 through 4 and feeds an auxiliary BIP-8 code word B4 and a correction code word for the outgoing line into the Z4 and Z5 time slots. The nework management center can acquire the present situation by analyzing the messages of the digital signal distributors 2 through 13. When storing messages, however, it can also provide quality indications over longer time spans.

It is seen that the invention provides a method for the correction and monitoring of errors in a data transmission system.

Although the invention has been described with respect to preferred embodiments, it is not to be so limited as changes and modifications can be made which are within the full intended scope of the invention as defined by the appended claims.

I claim as my invention:

1. A method for quality monitoring a digital signal in sections of a data transmission circuit, characterized in that a digital signal (STM-1) which has a bit rate of 155.52 Mbit/s or a multiple thereof in a digital signal (STM-n) of, a higher order of a synchronous digital signal hierarchy is monitored according to the CCITT draft recommendations G.70X, G.70Y and G.70Z, with a parity monitoring with a BIP-8 code word as a B3 byte of a path overhead (VC-4 POH) of a virtual container (VC-4) for a bit rate of 149.72 Mbit/s; wherein sections between a digital signal source (5) of the digital signal (STM-1) and a first digital signal distributor (6), and between respectively two neighboring digital signal distributors (6, 7; 7, 8; 8, 9; 9, 10; 10, 11; 11, 12; 12, 13) and between the last digital signal distributor (13) and a digital signal sink (14) of the digital signal (STM-1) are selected along a data transmission circuit (15); and the BIP-8 code word is supplied, first, as an auxiliary BIP-8 code word (B4) and, second, as a correction code word into two selected Z time slots (Z4, Z5) in the digital signal source (5) or in the first digital signal distributor (6) when it receives arbitrary but identical code words in two selected Z time slots (Z4, Z5) of the path overhead (VC-4 POH); and that every digital signal distributor (6 through 13) receives both auxiliary BIP-8 code words (B4) supplies two new auxiliary BIP-8 code words (B4), and compares at least one of these code words to the corresponding, received auxiliary BIP-8 code word (B4) and reports a deficiency or the present condition to a center (1 through 4) of a centrally controlled emergency network switching system; and in the digital signal sink (14) evaluates at least one of the received auxiliary BIP-8 code words (B4).

2. A method for quality monitoring of a digital signal in sections of a data transmission circuit, characterized in that a digital signal (STM-1) which has a bit rate of 155.52 Mbit/s or a multiple thereof in a digital signal (STM-N) of a higher order of a synchronous digital signal hierarchy is monitored according to the CCITT draft recommendations G.70X, G.70Y and G.70Z, so that a parity monitoring occurs with a BIP-8 code word as B3 byte of a path overhead (VC-4 POH) of a virtual container (VC-4) for a bit rate of 149.72 Mbit/s; and the sections between a digital signal source (5) of the digital signal (STM-1) and a first digital signal distributor (6), between respectively two neighboring digital signal distributors (6, 7; 7, 8; 8, 9; 9, 10; 10, 11; 11, 12; 12, 13) and between the last digital signal distributor (13) and a digital signal sink (14) of the digital signal (STM-1) are selected along a [data] transmission circuit (15); arbitrary code words are fed into two selected Z time slots (Z4, Z5) of the path overhead (VC-4 POH) in the digital signal source (5); and a determination is made in the first digital signal distributor (6) regarding those bit places wherein inequality exists between the two code words; and the BIP-8 code word is supplied into one of the selected Z time slots (Z4) in the first digital signal distributor (6) as auxiliary BIP-8 code word (B4) and the BIP-8 code word is supplied into the other, selected Z time slot (Z5) in the first digital signal distributor (6) as a correction code word upon inversion in the identified bit places of the inequalities; and the auxiliary BIP-8 code word (B4) is newly formed in every further digital signal distributor (7 through 13), and is compared to the incoming word and is supplied into the one Z time slot (Z4); with coincidence, the received correction code word is newly supplied into the other Z time slot (Z5); and with non-coincidence, a determination is made regarding those bit places wherein there is inequality between the received auxiliary BIP-8 code word (B4) and the received correction code word and, upon inversion in the identified bit places of the inequality, the auxiliary BIP-8 code word (B4) is supplied into the other Z time slot (Z5) as a new correction code word; and a deficiency or the present condition is respectively reported to a center (1 through 4) of a centrally controlled emergency network switching system; and the digital signal sink (14) evaluates the auxiliary BIP-8 code word (B4).

* * * * *